(12) United States Patent
Shestak et al.

(10) Patent No.: US 8,115,979 B2
(45) Date of Patent: Feb. 14, 2012

(54) INK MINIMIZING PROFILE MAKING TOOL

(75) Inventors: Vladimir V. Shestak, Boulder, CO (US); Larry D. Teklits, Loveland, CO (US); Larry M. Ernst, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 857 days.

(21) Appl. No.: 12/151,824

(22) Filed: May 9, 2008

(65) Prior Publication Data

US 2009/0279112 A1    Nov. 12, 2009

(51) Int. Cl.
H04N 1/46 (2006.01)
G03F 3/08 (2006.01)

(52) U.S. Cl. ........ 358/523; 358/3.24; 358/504; 382/167

(58) Field of Classification Search .................... 358/1.9, 358/3.01, 3.21, 3.24, 504, 515, 518, 523; 382/167
See application file for complete search history.

(56) References Cited

U.S. PATENT DOCUMENTS

| | | | |
|---|---|---|---|
| 7,057,765 B1 * | 6/2006 | Fischer et al. | 358/1.9 |
| 7,163,269 B2 | 1/2007 | Levine et al. | |
| 7,196,817 B2 | 3/2007 | Couwenhoven et al. | |
| 7,212,635 B2 | 5/2007 | Nishikawa | |
| 2004/0114159 A1 * | 6/2004 | Couwenhoven et al. | 358/1.9 |
| 2005/0083346 A1 | 4/2005 | Takahashi et al. | |
| 2005/0151981 A1 * | 7/2005 | Levine et al. | 358/1.9 |
| 2005/0248783 A1 * | 11/2005 | Tin | 358/1.9 |
| 2006/0098039 A1 | 5/2006 | Huang et al. | |
| 2007/0076260 A1 * | 4/2007 | Upton | 358/3.21 |

OTHER PUBLICATIONS

Chen, Yongda, et al., "A Multi-Ink Color-Separation Algorithm Maximizing Color Constancy", (2003).
Fleming, Paul D., et al., "Color Management with ICC Profiles: Can't Live without It so Learn to Live with It", (2002).
Sharma, Abhay, "Measuring the Quality of ICC Profiles and Color Management Software", (2003).
Smith, Jay, et al., "Resource Allocation in a Cluster Based Imaging System", (2007).

* cited by examiner

*Primary Examiner* — James A Thompson
(74) *Attorney, Agent, or Firm* — Blakely, Sokoloff, Taylor & Zafman LLP

(57) ABSTRACT

An International Color Consortium (ICC) profile making tool includes a regression module to establish a dependency between a profile connection space (PCS) and a device color space and an optimization module to generate a first output profile based on an ink minimization mode and a second output profile based on a high accuracy mode.

20 Claims, 3 Drawing Sheets

$$
\begin{vmatrix} b_1 \\ b_2 \\ b_3 \\ b_4 \\ b_5 \\ . \\ b_N \\ a_1 \\ a_2 \\ a_3 \\ a_4 \\ a_5 \\ . \\ a_N \\ L_1 \\ L_2 \\ L_3 \\ L_4 \\ L_5 \\ . \\ L_N \end{vmatrix} = \begin{vmatrix} 1 & C_1 & M_1 & Y_1 & K_1 & 0 & 0 & 0 & 0 & 0 & 0 & 0 & 0 & 0 & 0 \\ 1 & C_2 & M_2 & Y_2 & K_2 & 0 & 0 & 0 & 0 & 0 & 0 & 0 & 0 & 0 & 0 \\ 1 & C_3 & M_3 & Y_3 & K_3 & 0 & 0 & 0 & 0 & 0 & 0 & 0 & 0 & 0 & 0 \\ 1 & C_4 & M_4 & Y_4 & K_4 & 0 & 0 & 0 & 0 & 0 & 0 & 0 & 0 & 0 & 0 \\ 1 & C_5 & M_5 & Y_5 & K_5 & 0 & 0 & 0 & 0 & 0 & 0 & 0 & 0 & 0 & 0 \\ 1 & . & . & . & . & 0 & 0 & 0 & 0 & 0 & 0 & 0 & 0 & 0 & 0 \\ 1 & C_N & M_N & Y_N & K_N & 0 & 0 & 0 & 0 & 0 & 0 & 0 & 0 & 0 & 0 \\ 0 & 0 & 0 & 0 & 0 & 1 & C_1 & M_1 & Y_1 & K_1 & 0 & 0 & 0 & 0 & 0 \\ 0 & 0 & 0 & 0 & 0 & 1 & C_2 & M_2 & Y_2 & K_2 & 0 & 0 & 0 & 0 & 0 \\ 0 & 0 & 0 & 0 & 0 & 1 & C_3 & M_3 & Y_3 & K_3 & 0 & 0 & 0 & 0 & 0 \\ 0 & 0 & 0 & 0 & 0 & 1 & C_4 & M_4 & Y_4 & K_4 & 0 & 0 & 0 & 0 & 0 \\ 0 & 0 & 0 & 0 & 0 & 1 & C_5 & M_5 & Y_5 & K_5 & 0 & 0 & 0 & 0 & 0 \\ 0 & 0 & 0 & 0 & 0 & 1 & . & . & . & . & 0 & 0 & 0 & 0 & 0 \\ 0 & 0 & 0 & 0 & 0 & 1 & C_N & M_N & Y_N & K_N & 0 & 0 & 0 & 0 & 0 \\ 0 & 0 & 0 & 0 & 0 & 0 & 0 & 0 & 0 & 0 & 1 & C_1 & M_1 & Y_1 & K_1 \\ 0 & 0 & 0 & 0 & 0 & 0 & 0 & 0 & 0 & 0 & 1 & C_2 & M_2 & Y_2 & K_2 \\ 0 & 0 & 0 & 0 & 0 & 0 & 0 & 0 & 0 & 0 & 1 & C_3 & M_3 & Y_3 & K_3 \\ 0 & 0 & 0 & 0 & 0 & 0 & 0 & 0 & 0 & 0 & 1 & C_4 & M_4 & Y_4 & K_4 \\ 0 & 0 & 0 & 0 & 0 & 0 & 0 & 0 & 0 & 0 & 1 & C_5 & M_5 & Y_5 & K_5 \\ 0 & 0 & 0 & 0 & 0 & 0 & 0 & 0 & 0 & 0 & 1 & . & . & . & . \\ 0 & 0 & 0 & 0 & 0 & 0 & 0 & 0 & 0 & 0 & 1 & C_N & M_N & Y_N & K_N \end{vmatrix} \times \begin{vmatrix} \beta_{1const} \\ \beta_{11} \\ \beta_{12} \\ \beta_{13} \\ \beta_{14} \\ \beta_{2const} \\ \beta_{21} \\ \beta_{22} \\ \beta_{23} \\ \beta_{24} \\ \beta_{3const} \\ \beta_{31} \\ \beta_{32} \\ \beta_{33} \\ \beta_{34} \end{vmatrix}
$$

Figure 2

INK MINIMIZING PROFILE MAKING TOOL

FIELD OF THE INVENTION

This invention relates generally to the field of printing systems. More particularly, the invention relates to managing and controlling ink usage in a color printing system.

BACKGROUND

Growth in color management has resulted in an increase in software packages that are used to generate International Color Consortium (ICC) profiles. ICC profiles describe color attributes of a particular device or viewing requirement by defining a mapping between a source or target color space and a profile connection space (PCS), which is either CIELAB (L*a*b*) or CIEXYZ.

An ICC profile also plays an important role in ink consumption at a printer driver, or third party software, since the profile provides the means of determining CMYK intensities for each point in a given image. The minimization of ink usage at printers has been an important and challenging problem, which has had a significant economic impact. Current approaches to minimizing ink in ICC profiles are based on limiting a peak coverage or black removal heuristics. However, the ink saving efficiency of such mechanisms is quite limited.

Therefore, what is desired is an ICC profile mechanism that provides for efficient ink minimization.

SUMMARY

In one embodiment, an ICC profile tool is disclosed. An International Color Consortium (ICC) profile tool includes a regression module to establish a dependency between a profile connection space (PCS) and a device color space and an optimization module to generate a first output profile based on an ink minimization mode and a second output profile based on a high accuracy mode.

In another embodiment, a method is disclosed. The method includes performing a regression method to establish a dependency between a profile connection space (PCS) and a device color space and performing an optimization method to generate a first ICC profile based on an ink minimization mode and a second ICC profile based on a high accuracy mode.

DESCRIPTION OF THE DRAWINGS

A better understanding of the present invention can be obtained from the following detailed description in conjunction with the following drawings, in which:

FIG. 2 illustrates one embodiment of a regression model.

DETAILED DESCRIPTION

An ICC profile tool is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
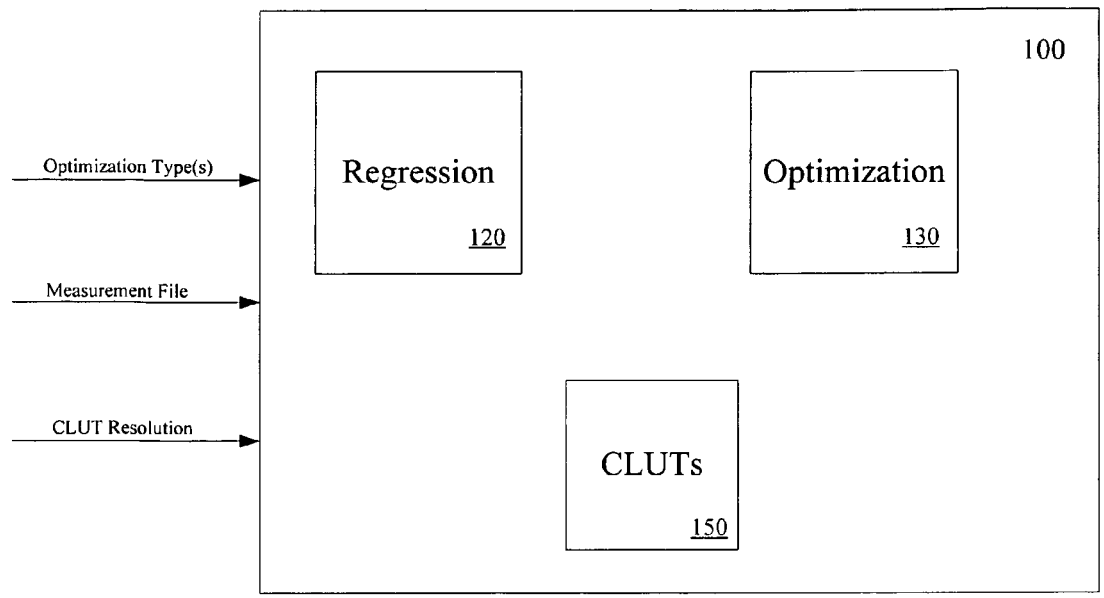
FIG. 1 illustrates one embodiment of an ICC profile tool.

FIG. 1 illustrates one embodiment of an ICC profile tool 100. Profile tool 100 is a tool for making, editing and assessing ICC profiles. According to one embodiment, ICC profile tool 100 generates an ICC output profile with respect to a set of parameter values that are passed to a point operation optimization algorithm.

In such an embodiment, a multitude of different ICC profiles, depending on a parameter setup, may be produced for a given printer that addresses a trade-off between print quality and amount of ink required. In a further embodiment, the output profile may be applied to any ink jet or EP printer.

According to one embodiment, tool 100 receives as input from a user: a measurement file, type of optimization and color lookup table (CLUT) resolution. CLUT resolution determines how many evenly distributed points will be used to represent a grid that spans an entire device independent color space (e.g., typical values 9, 25, or 33).

The measurement file may be a standard print charts, e.g., ECI2002V, printed on a target printer and measured in XYZ or the CIE 1976 L*a*b color spaces. In one embodiment, the measurement file is obtained by a particular printer printing out the chart, which is measured using a spectrophotometer. As a result, the set of points (called sample set) in L*a*b is obtained with known responses in the device color space.

The type of optimization includes an ink minimizing mode and a high accuracy mode. The ink minimizing mode enables a user to establish a limit as to how much a reproduced color (e.g., the result of ink minimization) can deviate from the requested color in the device independent color space. In one embodiment, a user specifies a level of print quality that is acceptable in the ink minimizing mode. The high accuracy mode ensures that color error will be minimized between the requested and reproduced color regardless of the amount of ink consumed. In one embodiment each mode, an ICC profile is generated that includes an associated set of CLUTs 150 that can be used in the color management system of a given printer to implement the respective mode.

According to one embodiment, tool 100 includes regression module 120 and optimization module 130. The regression module performs a method that establishes dependency between L*a*b and device color space (e.g., CMYK). In one embodiment, the regression method avoids contouring effects on images.

Regression Model

As a first step, regression module 120 retrieves the sample set derived from the measurement file. In one embodiment, the above-described functional dependency between L*a*b* and CMYK is established using polynomials. For example for the first degree polynomial degree, the functional dependency, denoted as F(CMYK)→LAB, can be written as:

$$\begin{bmatrix} b \\ a \\ L \end{bmatrix} = \begin{bmatrix} \beta_{const1} & \beta_{11} & \beta_{12} & \beta_{13} & \beta_{14} \\ \beta_{const2} & \beta_{21} & \beta_{22} & \beta_{23} & \beta_{24} \\ \beta_{const3} & \beta_{31} & \beta_{32} & \beta_{33} & \beta_{34} \end{bmatrix} \times \begin{bmatrix} C \\ M \\ Y \\ K \end{bmatrix}$$

where (3×5) β matrix contains the regression coefficients.

The computation of these coefficients is based on the closed form solution of the least square error minimization for the subset of sample points. This subset of sample points is selected individually for each node in the constructed BtoA CLUT. This concept of locality is very important as F(CMY K)→LAB may vary from one region of printer's gamut to another.

Suppose that the given subset of sample points is composed of N points, each point i, $1 \leq i \leq N$ is specified by $L_i a_i b_i$ coordinates in Lab space and $C_i M_i Y_i K_i$ in CMYK space. The regression model for the first degree polynomial is shown in FIG. 2. Let $\hat{b}_i$, $\hat{a}_i$, and $\hat{L}_i$ denote the b, a and L components of the right hand side vector in FIG. 2, computed when β coefficients are found.

The least square regression implies that β coefficients are determined such that $$\sqrt{\sum_{i=1}^{N}\left[(b_i - \hat{b}_i)^2 + \sum_{i=1}^{N}(a_i - \hat{a}_i)^2 + \sum_{i=1}^{N}(L_i - \hat{L}_i)^2\right]} \quad \text{(Equation 1)}$$

is minimized. It is very important to note that this is a least squares optimization of Euclidean distances between actual sample points in Lab space and corresponding mappings from CMYK space. To see this, Equation 1 can be written as $$\sqrt{\sum_{i=1}^{N}\left[(b_i - \hat{b}_i)^2 + \sum_{i=1}^{N}(a_i - \hat{a}_i)^2 \sum_{i=1}^{N}(L_i - \hat{L}_i)^2\right]} = \quad \text{(Equation 2)}$$

$$\sqrt{\sum_{i=1}^{N}\left(\sqrt{(b_i - \hat{b}_i)^2 + \sum_{i=1}^{N}(a_i - \hat{a}_i)^2 + \sum_{i=1}^{N}(L_i - \hat{L}_i)^2}\right)^2} =$$

$$\sqrt{\sum_{i=1}^{N}\Delta_i^2}$$

By these means, our regression model resolves the common pitfall in color science based on the fact that the least squares optimization is applied to find β coefficients separately for L, a and b. As a result, that approach does not minimize $$\sqrt{\sum_{i=1}^{N}\Delta_i^2}.$$

Let V (C M Y K) be a vector formed with all terms of k-degree polynomial constructed from the elements of [C M Y K] vector. In general, the F(CMY K)→LAB can be expressed as [L a b]=[3×length of V(C M Y K)] β matrix×V(C M Y K). In one embodiment, first degree polynomials were used in profile tool 100 for subsets with a small number of sample points, second degree—for other subsets.

Optimization Setup

Figure 3:
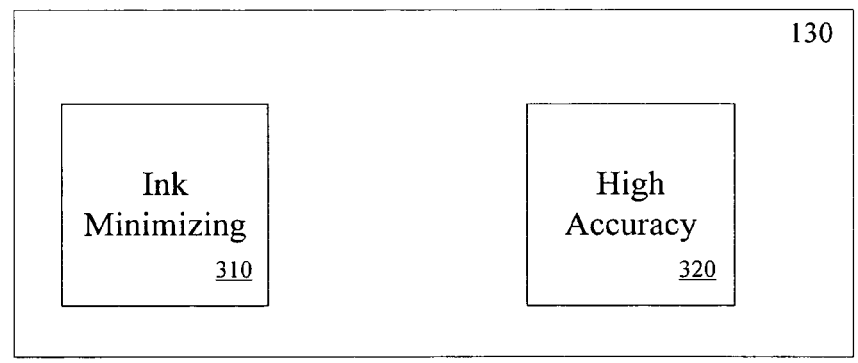
FIG. 3 illustrates one embodiment of an optimization module.

Referring back to FIG. 1, once the regression method has been performed at regression module 120 control is forwarded to optimization module 130. FIG. 3 illustrates one embodiment of an optimization module 130. Optimization module 130 includes two modules to perform optimization setups for non-linear optimization. These modules include ink minimizing module 310 and high accuracy module 320. However, in some embodiments, an ink limit may be applied at both modules.

Let [lab] denote a node in the constructed BtoA CLUT. Once the local relation F(CMY K)→LAB is established node for node [lab], the optimization problem can be formulated mathematically at ink saving module 310 and high accuracy module 320. The ink saving mode is formulated as:

minimize C+M+Y+K subject to
||F(CMY K)−[lab]||$\leq \Delta_{limit}$;
C+M+Y+K$\leq \Omega_{limit}$;
$0 \leq C \leq 100$; $0 \leq M \leq 100$; $0 \leq Y \leq 100$; $0 \leq K \leq 100$,
while the high accuracy mode is formulated as:

minimize|F(CMY K)−[lab]|| subject to
C+M+Y+K$\leq \Omega_{limit}$;
$0 \leq C \leq 100$; $0 \leq M \leq 100$; $0 \leq Y \leq 100$; $0 \leq K \leq 100$, where $\Delta_{limit}$ and $\Omega_{limit}$ specify the maximum deviation from node [lab] in L*a*b* space and maximum ink coverage, respectively.

In these formulations, the non-linear element ||F(CMY K)−[lab]|| provides a qualitative measure of deviation from node [lab]. In one embodiment, an additional constraint limiting ink coverage is provided to the set of constraints to prevent paper distortion failures (e.g., curl, cockle, and tearing). In a further embodiment, the formulations can be modified to address the specific details of optimization. For example C+M+Y+K can be replaced with a weighted sum $p_c \times C + p_m \times M + p_k \times K$, where each coefficient p represents a cost of the corresponding ink.

According to one embodiment, a local optimal solution can be found for the non-linear constrained optimization modes in a finite number of iterations by applying mathematical procedures based on the projected gradient methods, penalty function, etc. In another embodiment, commercially available third party optimization packages, e.g., Matlab, Lingo, can be used for this purpose. In addition, a variety of global optimization iterative heuristics, e.g., Genetic Algorithm, Simulated Annealing, can be adapted for this purpose.

System

Figure 4:
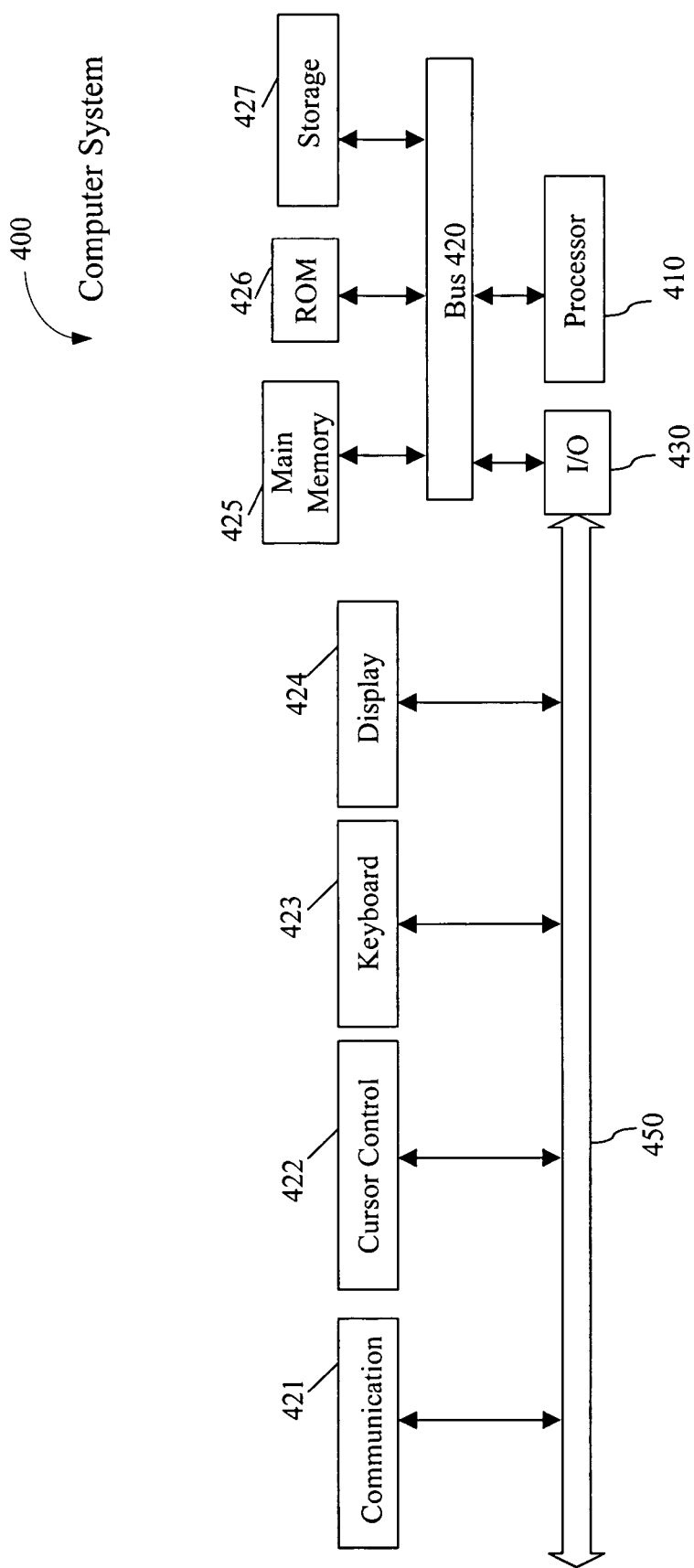
FIG. 4 illustrates one embodiment of a computer system.

FIG. 4 illustrates a computer system 400 on which ICC profile tool 100 may be implemented. Computer system 400 includes a system bus 420 for communicating information, and a processor 410 coupled to bus 420 for processing information. According to one embodiment, processor 410 is implemented using one of the multitudes of ARM™ microprocessors. Nevertheless one of ordinary skill in the art will appreciate that other processors may be used.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients) via external data network 170. The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The above-described ICC profile making tool designed ink jet and EP printers minimizes the total cost (or volume) of CMYK required to produce images with a requested perceptual print quality. The ICC profile making tool is capable of producing high accuracy ICC profiles and ICC profiles with minimized ink usage at user specified level of print quality. Further, the ICC output profiles produced with the tool are compliant with ICC.1:2004-10, profile version 4.2.0.0 specification. The CLUTs in these profiles are computed utilizing a point operation method based on the specifically designed regression and state-of-the-art non-linear constrained optimization techniques.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer system comprising:
   a memory to store a profile tool, including:
      a regression module to establish a dependency between a set of points in a profile connection space (PCS) and a device color space; and
      an optimization module to generate a first output profile for the set of points based on an ink minimization mode and a second output profile for the set of points based on a high accuracy mode, wherein the ink minimization mode establishes a limit as to how much a reproduced color in the device color space can deviate from a color associated with the set of points in the PCS; and
   a processor to execute the profile tool.

2. The computer system of claim 1 wherein the ink minimization mode minimizes an amount of ink used when performing a print job via the first output profile.

3. The computer system of claim 2 wherein the ink minimization mode enables a profile tool user to establish a limit as to how much a reproduced color can deviate from a requested color in the PCS.

4. The computer system of claim 3 wherein the user provides an input to the profile tool specifying a level of print quality that is acceptable in the ink minimization mode.

5. The computer system of claim 2 wherein the high accuracy mode ensures that color error will be minimized between the requested and reproduced color regardless of the amount of ink consumed.

6. The computer system of claim 1 wherein the first output profile comprises a first set of color lookup tables (CLUTs) and the second output profile comprises a second set of CLUTs.

7. The computer system of claim 1 wherein the profile tool receives a measurement file as an input.

8. The computer system of claim 7 wherein the measurement file is generated by measuring a print chart using a spectrophotometer.

9. The computer system of claim 8 wherein the profile tool generates a sample set in the PCS with known responses in the device color space from the measurement file.

10. The computer system of claim 9 wherein the regression module retrieves the sample set to establish the dependency between the PCS and the device color space.

11. The computer system of claim 1 wherein the profile tool receives a color lookup table (CLUT) resolution is an input to determine a number of evenly distributed points that will be used to represent a grid that spans the PCS.

12. A computer-generated method comprising:
   a processor performing a regression method to establish a dependency between a set of points in a profile connection space (PCS) and a device color space; and
   the processor performing an optimization method to generate a first profile for the set of points based on an ink minimization mode and a second profile for the set of points based on a high accuracy mode wherein the ink minimization mode establishes a limit as to how much a reproduced color in the device color space can deviate from a color associated with the set of points in the PCS.

13. The computer-generated method of claim 12 further comprising receiving an input specifying a level of print quality that is acceptable in the ink minimization mode.

14. The computer-generated method of claim 12 further comprising receiving an input establishing a limit as to how much a reproduced color can deviate from a requested color in the PCS.

15. The computer-generated method of claim 12 wherein the first ICC profile comprises a first set of color lookup tables (CLUTs) and the second profile comprises a second set of CLUTs.

16. The computer-generated method of claim 12 further comprising receiving a measurement file.

17. The computer-generated method of claim 16 further comprising generating a sample set in the PCS with known responses in the device color space from the measurement file.

18. The computer-generated method of claim 17 wherein the regression module retrieves the sample set to establish the dependency between the PCS and the device color space.

19. The computer-generated of claim 12 further comprising receiving a color lookup table (CLUT) resolution to determine a number of evenly distributed points that will be used to represent a grid that spans the PCS.

20. An article of manufacture comprising a non-transitory computer-readable medium having associated data, wherein the data, when accessed, results in a machine performing operations comprising:

performing a regression method to establish a dependency between a set of points in a profile connection space (PCS) and a device color space; and performing an optimization method to generate a first profile for the set of points based on an ink minimization mode and a second profile for the set of points based on a high accuracy mode wherein the ink minimization mode establishes a limit as to how much a reproduced color in the device color space can deviate from a color associated with the set of points in the PCS.

* * * * *